United States Patent [19]

York et al.

[11] 4,433,389
[45] Feb. 21, 1984

[54] MEMORY ADDRESS TRANSLATION SYSTEM FOR ACCESSING MEMORY LOCATIONS VIA JOB NAMES

[75] Inventors: Kenneth L. York, Huntingdon Valley; Oscar B. Stram, Paoli, both of Pa.

[73] Assignee: Burroughs Corporation, Detroit, Mich.

[21] Appl. No.: 244,152

[22] Filed: Mar. 16, 1981

Related U.S. Application Data

[63] Continuation of Ser. No. 972,916, Dec. 26, 1978.

[51] Int. Cl.³ .......................... G06F 7/00; G06F 7/38; G06F 7/50
[52] U.S. Cl. .................................................. 364/900
[58] Field of Search ... 364/200 MS File, 900 MS File

[56] References Cited

U.S. PATENT DOCUMENTS

| | | | |
|---|---|---|---|
| 3,949,370 | 4/1976 | Reyling et al. | 364/200 |
| 3,980,874 | 9/1976 | Vora | 364/746 |
| 4,158,227 | 6/1979 | Baxter et al. | 364/200 |
| 4,161,036 | 7/1979 | Morris et al. | 364/900 |

*Primary Examiner*—Gareth D. Shaw
*Assistant Examiner*—John G. Mills
*Attorney, Agent, or Firm*—Mervyn L. Young; Leonard C. Brenner; K. R. Peterson

[57] ABSTRACT

In a named data processing system having a plurality of memory modules, each module therein having a plurality of locations for storing data pages and the like, a memory address translation apparatus and method translates a data job name and associated segmented address field into a memory module-page addressing pair wherein each and every storage location may be accessed by each and every job name. The job name and the associated segmented address field are each partitioned into most and least significant bit fields. Through translation a storage location is defined by the exclusive ORing of the least significant fields of the data job name and segmented address field. Likewise a memory module is defined by the exclusive ORing of the most significant fields of the job name and the segmented address field as permuted by an exclusive ORing with the least significant field of the segmented address field. Preferably, in order to increase address spacing activity, the most significant field of the job name is processed through a Fibonacci hashing process before any exclusive ORing process.

7 Claims, 4 Drawing Figures

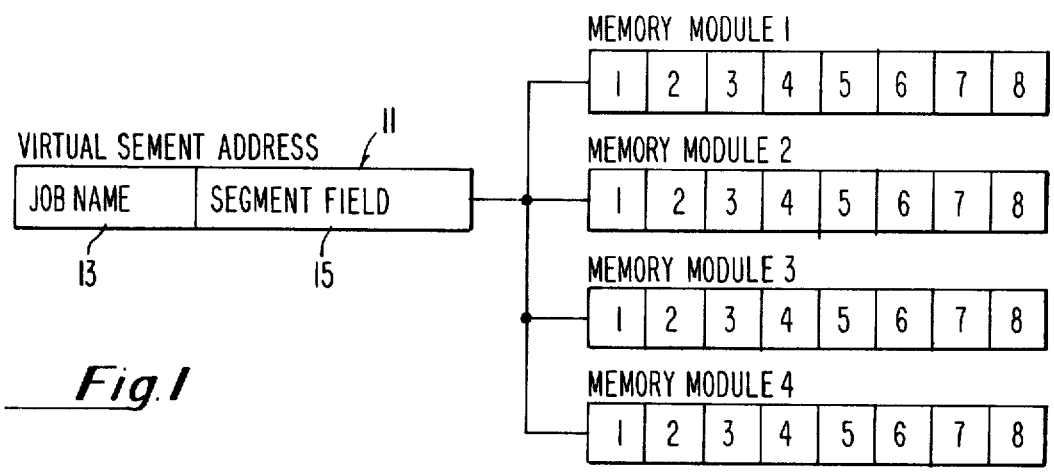
_Fig.1_
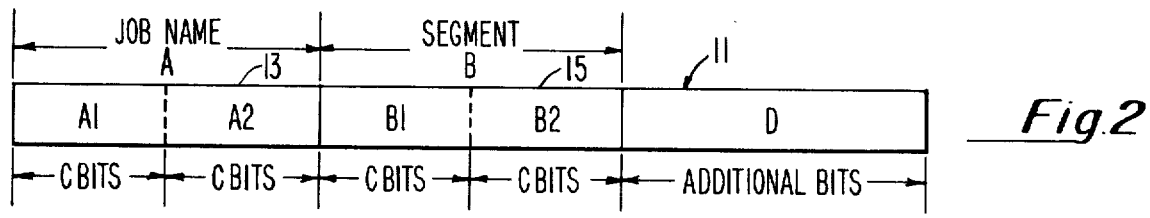
_Fig.2_
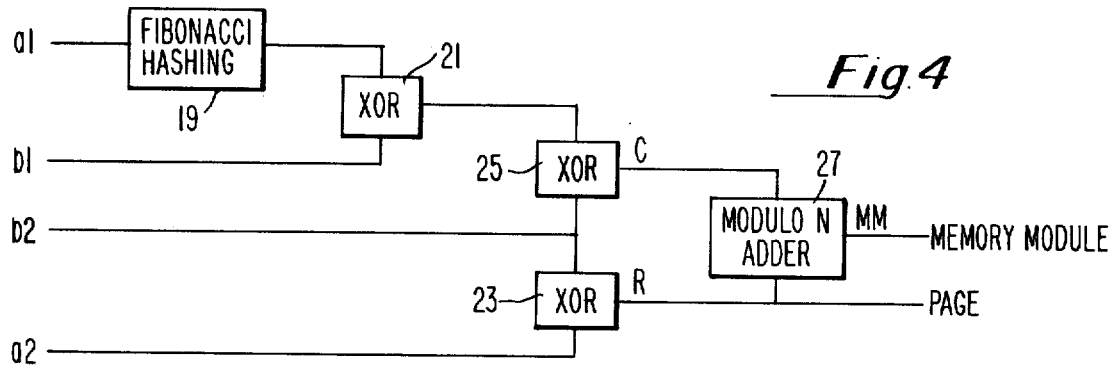
_Fig.4_
$R = a2 \text{ XOR } b2$
$C = b2 \text{ XOR } (a1 \text{ XOR } b1)$
_Fig.3_

MEMORY ADDRESS TRANSLATION SYSTEM FOR ACCESSING MEMORY LOCATIONS VIA JOB NAMES

This application is a continuation, of application Ser. No. 972,916, filed Dec. 26, 1978.

CROSS REFERENCES RELATED TO APPLICATION

In co-pending U.S. patent application Ser. No. 893,068, filed Apr. 3, 1978, for an "ERROR CONTROL SYSTEM FOR NAMED DATA", in the names of K. L. York et al and assigned to the assignee of the present invention, now U.S. Pat. No. 4,166,211, issued Aug. 28, 1979, there is disclosed a named data processing system operating in a hierarchial cache memory environment. The present invention although not limited thereto would function well in such an environment providing for all required hierarchial level address translations with a single translation using the method and apparatus disclosed.

BACKGROUND AND OBJECTS OF THE INVENTION

In the environment of a multi-memory module (or port) named data processing system wherein each job or data name is utilized to provide at least in part the addressing function for each memory module, each memory module having therein a plurality of storage locations for storing data pages or the like, the apparatus and method of the present invention provides a memory addressing translation system which permits each storage location to be accessed by each data name.

Two problems occur when a job name also serves as an addressing function in a multi-memory module environment. First, certain job names may not be able to access every storage location of every memory module thereby creating either forbidden regions of storage for a given job name or a set of forbidden job names. Second, certain job names may favor particular memory modules or regions therein and sparsely utilize other modules or storage locations.

Therefore, it is an object of the present invention to provide for a named data system a memory address translation method and apparatus which will permit the accessing of every memory storage location in a multi-memory module environment by every job name used therein.

It is another object of the present invention to provide for a named data system a memory address translation method and apparatus which will provide a high degree of uniformity in memory storage location utilization in a multi-memory module environment.

SUMMARY OF THE INVENTION

The above and other objects and features of the invention are realized by a memory address translation system for translating a job name and associated segmented address field into a memory module-page addressing pair wherein each and every storage location may be addressed by each and every job name. The job name and the associated segmented address field are each partitioned into most and least significant bit fields. Through translation a storage location is defined by the exclusive ORing of the least significant fields of the jobb name and segmented address field. Likewise a memory module is defined by the exclusive ORing of the most significant fields of the job name and the segmented address field as permuted by an exclusive ORing with the least significant field of the segmented address field. Preferably, in order to increase address spacing activity, the most significant field of the job name is processed through a Fibonacci hashing process before any exclusive ORing process.

BRIEF DESCRIPTION OF THE DRAWINGS

Other objects, features and advantages of this invention will be readily apparent and better understood by reference to the following detailed description when considered in conjunction with the appended claims and accompanying drawings in which:

FIG. 1 is an illustration of a multi-memory module system being addressed by a job name and segment field;

FIG. 2 illustrates the partitioning of the job name and segment field of FIG. 1 into most and least significant bit fields;

FIG. 3 demonstrates in tabular format the address translation in accord with the present invention on the job name and segment field of FIG. 2 to access the memory modules shown in FIG. 1; and FIG. 4 is a logic diagram for the translation hardware of the present invention.

DETAILED DESCRIPTION OF THE PREFERRED EMBODIMENT

In the preferred embodiment of the present invention a virtual segment address 11 comprising a job name field 13 and a segment field 15 is used to address a plurality of memory modules. Illustrated in FIG. 1 are memory modules 1 through 4. Each memory module comprises a plurality of storage locations identified in FIG. 1 as storage locations 1 through 8. Each storage location 1 through 8 is fashioned to store a desired portion of data such as a page, word, byte or bit.

The virtual segment address 11, see FIG. 2, comprising the job name 13 and the segment address field 15 may also comprise additional bits D. The additional bits D may be used to address a particular word, byte, or bit when the memory modules 1 through 4 are storing greater portions of data. The additional bits D are in the preferred embodiment, not processed through the translation processing system of the present invention. The job name field 13 identified as A in FIG. 2, comprises a most significant bit field A1 and a least significant bit field A2, each comprising C number of bits. Likewise the segment field 15 identified as B in FIG. 2 comprises a most significant bit field B1 and a least significant bit field B2, each bit field comprising C number of bits. The translation method and system of the present invention may be performed through the utilization of a look-up table 17 implementable either in software or as a hardware matrix, see FIG. 3. As a hardwired matrix or ROM, this table would replace modulo N ADDER 27 in FIG. 4 to which the values of R and C are applied. It will be appreciated that in such a matrix or ROM form, the respective numbers in the table would be in binary form rather than the decimal form shown in FIG. 3. The row number of the look-up table 17 is defined as being equal to a2 XOR b2 wherein a2 is an actual least significant bit field selected from the least significant bit field A2 of the job name 13. Likewise the b2 represents an actual least significant bit address from the least significant bit field B2 of the address segment 15. The term "XOR" implies that an exclusive ORing process bit-by-bit, is occurring with the functions a2 and b2. The column number of the look-up table 17 is defined by b2 XOR (a1 XOR b1). Since a1 and b1 represent most significant fields and therefore may be constant over a period of time, a permutating function, b2 is introduced to increase activity in the Column C selection. In the look-up table 17 the Column C and Row R intersections identify or address a memory module MM. In the preferred embodiment of the invention, the addressed memory module MM is equal to the row number plus the column number taken modulo 8. However, those skilled in the art will appreciate that if the total number of rows and the total number of columns each equalled a positive integer such as N rather than 8, then the memory module MM specified by the C and R intersection would be equal to R+C quantity modulo N. Since in the preferred embodiment, N=8, there will be eight memory modules rather than the four modules shown in FIG. 1. The purpose of the modulo 8 ADDER 27 of FIG. 4 is, thus, to provide a module designation that is not greater than 8. Such an ADDER may be of the type illustrated in U.S. Pat. No. 3,980,874.

In performing the complete memory address translation in accord with the apparatus and method of the invention, it is preferred that scrambling of the Fibonacci hashing type be performed on the bits a1. The Fibonacci hashing system 19, see FIG. 4, is fabricated in accord with techniques well known in the art. See for example, Donald E. Knuth, THE ART OF COMPUTER PROGRAMMING, Volume 3, SORTING AND SEARCHING, Pages 508 through 513.

Fibonacci hashing is preferred because it leads to a most uniformly distributed sequence for a1 when the job name is increasing incrementally bit-by-bit. It is appreciated that a1, being the most significant bits of the job name field 13, remain constant over rather substantial periods of time when the job names are selected sequentially as is commonly the case. The Fibonacci hashing technique of which the above referred to Knuth reference gives examples, employs a Fibonacci sequence which is permuted with the input a1. The Fibonacci sequence is defined as being a sequence starting with 0, and 1 with every further term being the sum of the preceding two terms (see Knuth, supra, Vol. 1, page 13). Thus, such a sequence is 0, 1, 1, 2, 3, 5, 8, 13, .... Such a sequence can be generated by many circuits such as a simple ADDER where one of the inputs is just the output of the previous addition and the other input is the previous output. Thus, the circuitry of hashing system 19 in FIG. 4, may be just such an ADDER with two registers to store previous outputs with the result being exclusive OR'ed with the input a1. The most significant bit fields a1 and b1 are combined in an exclusive ORing circuit 21 which exclusively ORs on a bit-by-bit basis. Likewise the least significant bit fields a2 and b2 are exclusively ORed in exclusive OR circuit 23. The output of the exclusive OR circuit 21 and the least significant bit field b2 are exclusively ORed together in a exclusive OR circuit 25 to produce C which represents the column number of the look-up table in FIG. 3. The output of exclusive OR circuit 23 generates R which is the row number of the look-up table of FIG. 3. In an alternate hardware embodiment also shown in FIG. 4, C and R are fed into a modulo N adder 27, the generated output MM of which identifies the selected memory module number MM. In such case, the output R from exclusive OR circuit 23 identifies the selected page or memory storage location within the selected memory module MM.

The above-described memory address translation method and apparatus has been described and shown for a single level multi-memory module system. It is appreciated that such a method and apparatus would be of great benefit in a multi-level cache memory system such as described in the above-cited U.S. patent application, Ser. No. 893,068, now U.S. Pat. No. 4,166,211. Further, other additions and modifications to the preferred embodiment may be made. As an example, each memory module MM may be replaced by a memory control unit controlling the single or plurality of stacked memories. Pages or storage locations within each memory module may be of varying sizes in varying levels of the case memory hierarchy.

Thus, although the present memory translation apparatus and method invention has been described with a certain degree of particularity, it should be understood that the present disclosure has been made by way of example and that changes in the combination and arrangements of parts obvious to one skilled in the art, may be resorted to without departing from the scope and spirit of the invention.

What is claimed is:

1. A memory address translation apparatus for a data storage system having a plurality of memory modules, each memory module therein having a plurality of addressable storage locations, said data storage system addressed by a data name and an address segment, each data name and each address segment having a plurality of least significant bits and a plurality of most significant bits, said memory address translation apparatus comprising:

storage location address means including least significant bit means receiving said plurality of least significant bits of said data name and said address segment for exclusively ORing said received plurality of least significant bits of said data name with said received plurality of least significant bits of said address segment to generate at the output thereof the address of an addressable storage location in said plurality thereof; and memory module address means including most significant bit means, permuting means and adder means;

said most significant bit means receiving said plurality of most significant bits of said data name and said address segment for exclusively ORing said received plurality of most significant bits of said data name with said received plurality of most significant bits of said address segment and for generating an output thereof;

said permuting means receiving said output of said most significant bit means and said plurality of said least significant bits of said address segment for exclusively ORing the output of said most significant bit means with said plurality of least significant bits of said address segment and for generating an output thereof; and said adder means receiving said output of said permuting means and said output of said least significant bit means for adding in modulo N fashion said output of said permuting means with said output of said least significant bit means to address a memory module in said plurality thereof, said N being equal to the number of memory modules in said plurality thereof.

2. The memory address translation apparatus of claim 1 wherein said means for combining in modulo N fashion includes a modulo N adder.

3. The memory address translation apparatus of claim 1 wherein said means for combining in modulo N fashion includes a two dimensional matrix addressed in one dimension by the output of said permuting means and in the other dimension by the output of said least significant bit means.

4. The memory address translation apparatus of claim 1 further including:
means for scrambling said plurality of most significant bits of said data name prior to providing same to said most significant bit means.

5. The memory address translation apparatus of claim 4 wherein said means for scrambling applies Fibonacci hashing to said plurality of most significant bits of said data name.

6. The memory address translation apparatus of claim 5 wherein said means for combining in modulo N fashion includes a modulo N adder.

7. The memory address translation apparatus of claim 6 wherein said means for combining in modulo N fashion includes a two dimensional matrix addressed in one dimension by the output of said permuting means and in the other dimension by output of said least significant bit means.

* * * * *